Patented Feb. 4, 1947

2,415,346

UNITED STATES PATENT OFFICE 2,415,346

PROCESS OF MAKING METAL HALIDES

Henry V. Farr, Ferguson, Mo., assignor to Mallinckrodt Chemical Works, St. Louis, Mo., a corporation of Missouri No Drawing. Application November 13, 1943, Serial No. 510,220

8 Claims. (Cl. 23—89)

This invention relates to processes for making metal salts, and with regard to certain more specific features, to processes for making metal halides.

This application is a continuation-in-part of my copending application Serial No. 264,487, filed March 27, 1939.

Among the several objects of the invention may be noted the provision of processes of the class described which commence with readily available, cheap raw materials, which raw materials are available in high degrees of purity, and from these raw materials prepare, in a simple and expeditious manner, the desired metal halide product, likewise in a high degree of purity, without necessitating long and involved purification steps; the provision of processes of the class described which, in addition, produce as by-products certain halogen acids in relatively high degrees of purity, which halogen acids are of themselves economically useful; and the provision of processes of the class described which are simple and economical to carry out. Other objects will be in part obvious and in part pointed out hereinafter.

The invention accordingly comprises the steps and sequence of steps, and features of synthesis, analysis, or metathesis, which will be exemplified in the processes hereinafter described, and the scope of the application of which will be indicated in the following claims.

When a metal halide is treated in solution with hydrogen halide (hereinafter referred to as a hydrohalide), the halogens being different, an equilibrium reaction is apparently set up as follows:

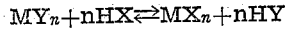

$$MY_n + nHX \rightleftarrows MX_n + nHY$$

(M being the metal in question, X being one halogen, and Y being another halogen; and n being the valence of M.) The equilibrium of this reaction depends upon many factors most of which need not be gone into herein. The most important factor herein concerned is, according to my observations, that the reaction appears to proceed towards the side of the equation in which the metal M is combined with the halogen of relatively greater atomic weight. For example, I have found that if Y in the above reaction is chlorine and X is bromine, the reaction proceeds toward the right-hand side of the equation; similarly, if Y is fluorine and X is chlorine, the reaction also proceeds toward the right-hand side of the equation. By removal of the hydrohalide HY, for example by boiling, the reaction proceeds progressively toward the right, and with sufficient boiling the reaction may be made to proceed to completion in the indicated direction.

The product acid, HY, may be recovered in useful form by any method which selectively removes it without significant contamination with the reagent acid HX. This can conveniently be accomplished, for example, by continuously removing the product acid from the reaction by fractional distillation.

The situation as above described is most fortunate from a commercial standpoint, because numerous metal chlorides are readily available at low cost in very high degrees of purity as starting materials for the reaction, and chlorine has the lowest atomic weight (excepting fluorine) of the halogens.

Hydrobromic and hydriodic acids, as starting materials, are likewise available in high degrees of purity.

For example, if a mixture of potassium chloride is made, for instance, with hydrobromic or hydriodic acid, and the mixture is heated, hydrochloric acid may be removed by evaporation, leaving potassium bromide or potassium iodide. In carrying out this procedure, it appears most convenient to mix the potassium chloride with the hydrobromic or hydriodic acid and then to distill off a mixture of hydrogen chloride gas and constant boiling aqueous hydrochloric acid. After most of the hydrogen chloride has come over, sufficient water is added to dissolve all of the salt, and the distillation is resumed. By distilling off this mixture through a short fractionating column, the hydrochloric acid distillate may be obtained practically or entirely free of hydrobromic or hydriodic acids, and whatever hydrobromic or hydriodic acid is recovered may be returned to the reaction vessel.

A particular feature of the reaction carried out as above is that, through the use of pure starting materials, which are readily available, the products obtained, namely, the metal halide and the hydrohalide, are both obtained initially at high degrees of purity, without the necessity of carrying through numerous purification steps such as recrystallization, distillations and the like. The hydrogen chloride obtained in the example set forth above, for example, is free of practically all impurities and may be obtained in at least of any desired strength. The product hydrohalide is thus a valuable by-product of the reaction.

If the reaction is carried through using the exact theoretical proportion of the starting hydrohalide, it is frequently somewhat difficult to distill off the last of the product hydrohalide. A convenient method which has been evolved to solve this difficulty is to add an excess of the starting hydrohalide and to carry out the distillation through a fractionating column connected with an absorber for collecting the product hydrohalide. When the greater part of the product hydrohalide has distilled off, water is added in amount sufficient to dissolve all of the remaining salt and the distillation is continued until practically all of the product hydrohalide has distilled over and the major part of the residual metallic halide has crystallized out. After cooling, then, the liquor which contains the excess of starting hydrohalide together with any residual product hydrohalide, is removed by suction from the crystals, and the crystals are rinsed with water to remove all of the mother liquor. The mother liquor may then be used without disadvantage in preparing the next reaction batch, since the product hydrohalide which it contains will readily distill over when the next batch is heated, according to the reaction given.

An advantage of the process of the present invention is that it apparently proceeds with all metals that form in aqueous solution the described type of halogen salts, namely, those corresponding to the formula $MX_n$, regardless of the hydrohalide used, provided the atomic weight criterion set forth above is followed. Typical of the metals which do not satisfy the foregoing requirement as to the formation of the desired type of halogen salts, is the metal gold. Gold salts in aqueous solution form haloauric acids when treated with acids. Similarly the tetravalent halides of palladium, iridium and platinum do not satisfy the foregoing requirement. These halides likewise form halometallic acids in aqueous solution when treated with acids. The metals which do form in aqueous solution the described type of halogen salts, that is, those corresponding to the formula $MX_n$, are well known to those skilled in the art.

The process of the present invention apparently proceeds even with metals whose halogen salts tend to hydrolyze to form oxyhalides if a sufficient concentration of the acid HX is maintained in the reaction mixture to prevent hydrolysis.

Without limiting the generality of the foregoing, the following are several specific examples illustrating the process of the present invention:

Example 1

149 grams of technical potassium chloride and 507 grams of constant boiling hydrobromic acid (48% HBr) were placed in a distillation apparatus and boiled. The salt did not dissolve completely. During the first ten minutes of the distillation, substantially only gaseous hydrogen chloride was evolved. This was absorbed in ice water. After about ten minutes, liquid began to come over. After 161 grams of distillate (total gas plus liquid) had been collected, the distillation was stopped and 200 cc. of water was added. This is sufficient to dissolve all of the salt. The distillation was then resumed and 229 grams of distillate were collected. At this point, a considerable quantity of salt had crystallized out in the distillation flask.

The distillate was analyzed, and found to contain (considering all portions) substantially 100% of the theoretical amount of hydrogen chloride, together with a very small amount of hydrogen bromide.

The salt and mother liquor in the distillation flask were treated as follows: The mother liquor was filtered off and the salt was washed twice by stirring with ice water and filtering with suction. The salt was then spread on a watch glass and dried in an electric oven at 110° C. for eighteen hours. The dried salt weighed 150 grams.

The combined wash liquors were then placed in the distillation apparatus and boiled down until the salt started to crystallize out. Then the mother liquor was added, and the boiling continued until very little liquor remained. The residue was then filtered and washed as before with two portions of ice water, and the recovered salts dried over night at 110° C. The salt thus recovered weighed 55 grams, making a total recovery of 205 grams, which is about 86% of the theoretical yield. On analysis, the salt was shown to be practically 100% KBr.

Example 2

149 grams of technical potassium chloride and 800 grams hydriodic acid (48% HI) were placed in a distillation apparatus and boiled. The salt dissolved completely. During the early stages of the distillation no gaseous hydrogen chloride came over, but only liquid. A total of 312 grams of distillate was collected, which, on analysis, was shown to contain practically the entire theoretical amount of hydrogen chloride, together with a very small amount of iodine and hydrogen iodide.

At this point a considerable quantity of salt had crystallized out in the distillation flask. The contents of the distillation flask were then transferred to an open vessel and evaporated to complete dryness. This yielded 310 grams of potassium iodide (96% of the theoretical yield) practically entirely free of potassium chloride.

Example 3

A portion of sodium fluoride and an excess of aqueous hydrochloric acid were mixed together in a platinum evaporating dish and heated to dryness. The remaining product, upon analysis, was shown to be practically pure sodium chloride.

Example 4

A portion of potassium bromide and an excess of aqueous hydriodic acid were mixed and evaporated to dryness in an open vessel. The remaining product, upon analysis, was shown to be potassium iodide with only a small amount of potassium bromide.

Example 5

Hydrobromic acid (660 grams) of 49% concentration and cuprous chloride (198 grams) were placed in a distilling flask connected to a condenser and the mixture brought to boiling at 110° C. Boiling was continued until the temperature reached 125° C. 447 grams of distillate were collected in ice water during this interval and the residue in the flask was a crystalline slurry amounting to 414 grams. The solid was filtered, washed with N/10 hydrobromic acid and dried. Cuprous bromide (191 grams) was obtained. Upon analysis it was found to be practically pure cuprous bromide.

Example 6

Following the procedure described in Example 5, zinc chloride (136 grams) and hydrobromic acid (362 grams) of 49% concentration were boiled together until considerable salt had separated in the flask and the mixture became quite thick. 237 grams of distillate were collected.

The reaction mixture was then placed in an evaporating dish and evaporated to dryness forming 215 grams of solid. Upon analysis this was found to be practically pure zinc bromide.

*Example 7*

Following the procedure described in Example 5, dihydrated barium bromide (167 grams) and hydriodic acid (532 grams) of 48% concentration were boiled together until considerable salt had separated in the distilling flask and the mixture became fairly thick. 460 grams of distillate were obtained. The solid was removed from the reaction mixture by suction and dried at 100° C. forming 140 grams of product. The filtrate was evaporated on a steam bath and dried forming 36 grams of dried salt. The products were substantially pure barium iodide.

*Example 8*

Calcium fluoride was prepared by dissolving dihydrated calcium chloride (147 grams) in distilled water (350 cc.) and adding a solution of anhydrous sodium carbonate (106 grams) in distilled water. The precipitate obtained was filtered and washed free of chloride ion. The freshly precipitated calcium carbonate was placed in a platinum evaporating dish with hydrofluoric acid (125 cc.) of 48% concentration. After the evolution of carbon dioxide had ceased, the solution was evaporated to dryness forming the theoretical amount of calcium fluoride. Calcium fluoride (39 grams) formed as described and hydriodic acid (255 grams) of 48% concentration were placed in a platinum evaporating dish and heated for several hours, adding hydriodic acid from time to time to replace that lost by evaporation until a total of 865 grams had been used. An additional 225 grams of hydriodic acid were then added and the hot liquor filtered. The filtrate was boiled down to 35 cc. and upon cooling a solid cake weighing 63 grams was obtained. Upon analysis this product was found to be almost pure calcium iodide, with water and a very small amount of calcium hydroxide. The calcium hydroxide was apparently formed by decomposition from heat of a small portion of the calcium iodide.

*Example 9*

Following the procedure described in Example 5, manganous chloride tetrahydrate (396 grams) was placed in a distilling flask and hydrobromic acid (347 grams, which is about half of theoretical required for complete conversion) of 49% concentration was added. The mixture was boiled until it had become fairly thick at which point 363 grams of distillate had been collected and the boiling point had risen to 117° C. Upon standing overnight the residue in the flask solidified and sufficient distilled water was added to dissolve the salt when hot, the resulting solution poured into evaporating dishes and heated overnight. The resulting solution was allowed to cool and crystals formed. These were filtered off and the filtrate again evaporated until crystals began to separate. After this mixture was allowed to cool it was filtered and the salt and filtrate placed in separate evaporating dishes and heated at 70° C. to apparent dryness. The total weight of salt thus obtained was 541 grams. A sample was analyzed and was found to contain 25.0% manganese, 31.1% bromine, 15.1% chlorine and 28.6% water. From these analyses it is seen that the product was a mixture of substantially equimolecular quantities of manganous chloride and manganous bromide.

*Example 10*

Sodium fluoride (21 grams) and concentrated hydrochloric acid (96 grams) were placed in a dish and evaporated to dryness with frequent stirring. 30.5 grams of dry salt were obtained. The product upon analysis was shown to contain 98.24% of sodium chloride.

In view of the above, it will be seen that the several objects of the invention are achieved and other advantageous results attained.

As many changes could be made in the above processes without departing from the scope of the invention, it is intended that all matter contained in the above description shall be interpreted as illustrative and not in a limiting sense.

I claim:

1. In the process of making halogen salts of metals that form in aqueous solution halogen salts of the type $MX_n$, by reacting a salt of the type $MY_n$ with an acid of the type HX, where M is the desired metal, X is the desired halogen, $n$ is the valence of M and Y is another halogen of lower atomic weight than X, the improvement comprising treating said salt with a substantially equivalent quantity of said acid in aqueous solution with sufficient water to form a constant boiling mixture and separating the product acid from the halogen salt produced.

2. In the process of making halogen salts of metals that form in aqueous solution halogen salts of the type $MX_n$, by reacting a salt of the type $MY_n$ with an acid of the type HX, where M is the desired metal, X is the desired halogen, $n$ is the valence of M and Y is another halogen of lower atomic weight than X, the improvement comprising heating said salt with a substantially equivalent quantity of said acid in aqueous solution with sufficient water to form a constant boiling mixture and separating the product acid from the halogen salt produced.

3. In the process of making alkali metal halides of metals that form in aqueous solution halogen salts of the type MX, where M is the metal and X is halogen, by reaction of aqueous solutions of the hydride of the desired halogen with a salt of the type $MY_n$, where M is the desired alkali metal, Y is another halogen of lower atomic weight than the desired halogen, and $n$ is the valence of M, the improvement comprising treating said salt with a substantially equivalent quantity of said acid in aqueous solution with sufficient water to form a constant boiling mixture and separating the product acid from the halogen salt produced.

4. In the process of making metal iodides of the type $MI_n$ of a metal that forms in aqueous solution salts of the type $MI_n$, by the reaction in an aqueous medium of hydrogen iodide on a metal salt $MY_n$, where M is the desired metal, Y is a halogen of lower atomic weight than iodine, and $n$ is the valence of M, the improvement comprising treating said salt with a substantially equivalent quantity of said acid in aqueous solution with sufficient water to form a constant boiling mixture and separating the product acid from the halogen salt produced.

5. In the process of making metal bromides of the type of $MBr_n$ of a metal that forms in aqueous solution salts of the type $MBr_n$, by the reaction in an aqueous medium of hydrogen bromide on a metal salt $MY_n$, where M is the desired metal, Y is a halogen of lower atomic weight than bromine, and $n$ is the valence of M, the improvement comprising treating said salt with a substantially equivalent quantity of said acid in aqueous solution with sufficient water to form a constant boiling mixture and separating the product acid from the halogen salt produced.

6. In the process of making potassium iodide by reaction in aqueous medium of hydrogen iodide with the potassium salt of a halogen of lower atomic weight than iodine, the improvement comprising treating said salt with a substantially equivalent quantity of said acid in aqueous solution with sufficient water to form a constant boiling mixture and separating the product acid from the halogen salt produced.

7. In the process of making cuprous bromide by reaction in aqueous medium of hydrogen bromide with cuprous chloride, the improvement comprising treating said cuprous chloride with a substaintially equivalent quantity of said hydrogen bromide in aqueous solution with sufficient water to form a constant boiling mixture and separating the product acid from the cuprous bromide produced.

8. In the process of making calcium iodide by reaction in aqueous medium of hydrogen iodide with calcium fluoride, the improvement comprising treating said calcium fluoride with a substantially equivalent quantity of said hydrogen iodide in aqueous solution with sufficient water to form a constant boiling mixture and separating the product acid from the calcium iodide produced.

HENRY V. FARR.

REFERENCES CITED

The following references are of record in the file of this patent:

Fremy's "Encyclopedia Chimique," Tome III, Metaux, 2nd Cahier, part 1, Potassium, pages 49 and 50 (1887).

Mellor's "Comprehensive Treatise on Inorganic and Theoretical Chemistry," vol. III, page 606 (1922).

Mellor's "Comprehensive Treatise on Inorganic and Theoretical Chemistry," 1927, vol. VII, page 81.